United States Patent
Geng et al.

(10) Patent No.: US 11,706,149 B2
(45) Date of Patent: Jul. 18, 2023

(54) PACKET SENDING METHOD, NETWORK NODE, AND SYSTEM

(71) Applicant: HUAWEI TECHNOLOGIES CO., LTD., Shenzhen (CN)

(72) Inventors: Xuesong Geng, Beijing (CN); Guoyi Chen, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 195 days.

(21) Appl. No.: 17/035,687

(22) Filed: Sep. 29, 2020

(65) Prior Publication Data

US 2021/0014168 A1 Jan. 14, 2021

Related U.S. Application Data

(63) Continuation of application No. PCT/CN2019/079787, filed on Mar. 27, 2019.

(30) Foreign Application Priority Data

Mar. 29, 2018 (CN) .......................... 201810273967.5

(51) Int. Cl.
*H04L 47/28* (2022.01)
*H04L 45/121* (2022.01)
*H04L 45/74* (2022.01)

(52) U.S. Cl.
CPC ............ *H04L 47/28* (2013.01); *H04L 45/121* (2013.01); *H04L 45/74* (2013.01)

(58) Field of Classification Search
CPC ....... H04L 47/28; H04L 45/121; H04L 45/74; H04L 45/30; H04L 45/50
See application file for complete search history.

(56) References Cited

U.S. PATENT DOCUMENTS 9,584,387 B1 * 2/2017 Cartlidge ................ H04L 43/50
11,233,732 B2 * 1/2022 Che ...................... H04L 12/4641
(Continued)

FOREIGN PATENT DOCUMENTS

CN 102123433 A 7/2011
CN 102394796 A 3/2012
(Continued)

OTHER PUBLICATIONS

N. Finn et al,"Deterministic Networking Architecture draft-ietf-detnet-architecture-01", DetNet Internet-Draft, Mar. 13, 2017, total 41 pages.
(Continued)

*Primary Examiner* — Mounir Moutaouakil
(74) *Attorney, Agent, or Firm* — Rimon PC

(57) ABSTRACT

A controller obtains a forwarding latency requirement of a service flow and a destination address of the service flow, and determines a forwarding path that meets the forwarding latency requirement. The controller determines that an ingress node forwards a first cycle time number of a packet and an intermediate node forwards a second cycle time number of the packet, and separately determines a corresponding adjacent segment identifier. A label stack generated by the controller includes the adjacent segment identifier and the adjacent segment identifier. The controller sends the label stack to the ingress node, to trigger the ingress node to forward the packet within a period of time corresponding to the first cycle time number. The controller determines the forwarding path based on the forwarding latency requirement of the service flow, and generates a label stack corresponding to a forwarding time point.

13 Claims, 11 Drawing Sheets

(56) References Cited

U.S. PATENT DOCUMENTS

| | | | |
|---|---|---|---|
| 2012/0259989 A1 | 10/2012 | Cousins | |
| 2015/0029837 A1* | 1/2015 | Ashwood-Smith | ........................ H04L 43/0811 370/242 |
| 2015/0229467 A1 | 8/2015 | Lee et al. | |
| 2016/0006614 A1* | 1/2016 | Zhao | ................. H04L 45/50 370/254 |
| 2016/0021223 A1 | 1/2016 | Choi et al. | |
| 2022/0060414 A1* | 2/2022 | Li | ........................ H04L 45/123 |

FOREIGN PATENT DOCUMENTS

| | | | |
|---|---|---|---|
| CN | 102647364 A | 8/2012 | |
| CN | 102752185 A | 10/2012 | |
| CN | 104219144 A | 12/2014 | |
| CN | 105791113 A | 7/2016 | |
| CN | 106656794 A | 5/2017 | |
| CN | 106888115 A | 6/2017 | |
| CN | 107222894 A | 9/2017 | |
| CN | 107615731 A | 1/2018 | |
| EP | 3091762 A1 | 11/2016 | |
| WO | WO-2020247626 A1 * | 12/2020 | ......... H04L 12/4633 |

OTHER PUBLICATIONS

IEEE P802.1 Qch/D2.2 "Draft Standard for Local and Metropolitan Area Networks Bridges and Bridged Networks—Amendment: Cyclic Queuing and Forwarding", Sponsor LAN/MAN Standards Committee of the IEEE Computer Society,Prepared by the Time Sensitive Networking Task Group of IEEE 802.1, Feb. 13, 2017, total 24 pages.

* cited by examiner

| Segment identifier | Cycle time number |
|---|---|
| SID 1 | 0001, 0011, 0021, 0031, ... |
| SID 2 | 0002, 0012, 0022, 0032, ... |
| SID 3 | 0003, 0013, 0023, 0033, ... |
| SID 4 | 0004, 0014, 0024, 0034, ... |
| SID 5 | 0005, 0015, 0025, 0035, ... |
| SID 6 | 0006, 0016, 0026, 0036, ... |
| SID 7 | 0007, 0017, 0027, 0037, ... |
| SID 8 | 0008, 0018, 0028, 0038, ... |
| SID 9 | 0009, 0019, 0029, 0039, ... |
| SID 10 | 0010, 0020, 0030, 0040, ... |

FIG. 4

CONT. FROM FIG. 5A

CONT. FROM FIG. 5A

CONT. FROM FIG. 5A

S507: Determine that a topmost label of a label stack of the second packet is an adjacent segment identifier of a second network node, and determine, according to a correspondence between an adjacent segment identifier and a cycle time number, a cycle time number corresponding to the adjacent segment identifier S508: The second network node pops out the adjacent segment identifier that is of the second network node and that is in the label stack of the second packet, to generate a third packet, and sends the third packet to a next-hop network node of the second network node within a period of time corresponding to the cycle time number

FIG. 5B

PACKET SENDING METHOD, NETWORK NODE, AND SYSTEM

CROSS-REFERENCE TO RELATED APPLICATIONS

This application is a continuation of International Application No. PCT/CN2019/079787, filed on Mar. 27, 2019, which claims priority to Chinese Patent Application No. 201810273967.5, filed on Mar. 29, 2018. The disclosures of the aforementioned applications are hereby incorporated by reference in their entireties.

TECHNICAL FIELD

The present invention relates to the communications field, and in particular, to a packet sending method, a network node, and a system.

BACKGROUND

Deterministic networking (deterministic networking, DetNet) can provide a highly reliable path for an application. The deterministic networking can provide a bounded latency guarantee and an ultra low packet loss rate. A bounded latency guarantee means that in an end-to-end packet forwarding process, a packet forwarding latency is within a fixed and required range. In other words, the packet forwarding latency needs to be within the latency range. A bounded latency is implemented through end-to-end reserved bandwidth resources and a queue management algorithm. Circular queue and forwarding (cyclic queuing and forwarding, CQF) is a queue management method that is applied to deterministic networking in a prior art. A core of the CQF technology is that a packet is sent within a cycle time (cycle time) of a node A on a forwarding path, the packet is received within a same cycle time of a next-hop node of the node, and the packet is sent in a next cycle time of the next-hop node. Therefore, a maximum latency per hop is one cycle time, and a maximum end-to-end latency is (N+1)×cycle time, where N is a quantity of intermediate nodes on a forwarding path that a packet passes through. However, because there is a link latency, a packet may be sent at an $n^{th}$ cycle time of a node, and may be received at an $(n+1)^{th}$ cycle time of a next-hop node. Therefore, CQF cannot accurately provide a deterministic latency guarantee during packet forwarding.

SUMMARY

This application provides a packet sending method, a network node, and a system, to accurately provide a latency guarantee during packet forwarding.

According to a first aspect, an embodiment of the present invention provides a packet sending method, where the method includes: obtaining, by a controller, a forwarding latency requirement of a service flow and a destination address of the service flow, and determining, based on the forwarding latency requirement and the destination address, a forwarding path for forwarding the service flow, where a latency of the forwarding path meets the forwarding latency requirement of the service flow, the forwarding path passes through a first network node and a second network node, the first network node is an ingress node of the forwarding path, and the second network node is an intermediate node of the forwarding path; determining, by the controller, a first cycle time number at which the first network node forwards a packet and a second cycle time number at which the second network node forwards the packet, and determining a first adjacent segment identifier corresponding to the first cycle time number and a second adjacent segment identifier corresponding to the second cycle time number, where the packet belongs to the service flow; generating, by the controller, a label stack, where the label stack includes the first adjacent segment identifier and the second adjacent segment identifier; and sending, by the controller, the label stack to the first network node, where the label stack is used to indicate the first network node to forward the packet via the forwarding path within a period of time corresponding to the first cycle time number.

According to the foregoing technical solution, the controller determines the forwarding path based on the forwarding latency requirement of the service flow, and separately determines the cycle time number corresponding to a forwarding time point of the ingress node and the cycle time number corresponding to a forwarding time point of the intermediate node, where the ingress node and the intermediate node are on the forwarding path. Then, the controller generates the corresponding label stack. The adjacent segment identifier in the label stack is corresponding to the cycle time number at which the node forwards the packet. In this way, the ingress node and the intermediate node of the forwarding path may forward, at a determined time point based on the label stack, the packet that belongs to the service flow, so that a deterministic latency guarantee can be provided during packet forwarding.

In a possible design, the packet is a first packet in the service flow, or any packet in the service flow.

In a possible design, the controller obtains a node latency of the first network node and a node latency of the second network node, where the node latency includes a packet processing latency and a packet sending latency. The controller obtains a link latency of a link on the forwarding path. That a latency of the forwarding path meets the forwarding latency requirement of the packet includes: a sum of the node latency of the first network node, the node latency of the second network node, and the link latency of the link on the forwarding path falls within a range of the forwarding latency requirement of the packet.

In a possible design, the latency of the forwarding path is equal to the sum of the node latency of the first network node, the node latency of the second network node, and the link latency of the link on the forwarding path.

In a possible design, the controller obtains cycle time duration of the first network node and cycle time duration of the second network node; the controller obtains a third cycle time number of the first network node and a fourth cycle time number of the second network node that are corresponding to a current time point of the controller; the controller determines the first cycle time number based on the cycle time duration of the first network node and the third cycle time number, where a start time point corresponding to the first cycle time number is after the first network node receives the label stack; and the controller determines the second cycle time number based on the cycle time duration of the first network node, a link latency between the first network node and the second network node, the packet processing latency of the second network node, the third cycle time number, and the cycle time duration of the second network node.

In a possible design, the controller receives a notification packet sent by the first network node, where the notification packet includes the forwarding latency requirement and the destination address of the packet.

According to a second aspect, an embodiment of the present invention provides a packet sending method, where the method includes: obtaining, by a first network node, a packet; obtaining, by the first network node, a first label stack based on the packet, where the first label stack is a label stack corresponding to a forwarding path for forwarding the packet, the first label stack includes an adjacent segment identifier of the first network node and an adjacent segment identifier of a second network node, the first network node is an ingress node of the forwarding path, and the second network node is an intermediate node of the forwarding path; pushing, by the first network node, the first label stack into the packet, where a top of the first label stack is the adjacent segment identifier of the first network node; determining, by the first network node based on the adjacent segment identifier of the first network node, a cycle time number at which the packet is forwarded; popping out, by the first network node, the adjacent segment identifier that is of the first network node and that is in the first label stack, to obtain a second label stack; and sending, by the first network node to the second network node within a period of time corresponding to the cycle time number, the packet including the second label stack.

In this technical solution, after obtaining the packet, the first network node obtains the first label stack based on the packet, and determines, based on the adjacent segment identifier that is included in the label stack and that is corresponding to the first network node, the corresponding cycle time number at which the first packet is forwarded. Then, the first network node sends the packet to a next hop of the first network node within the period of time corresponding to the cycle time number, so that the first network node sends the packet at a determined time point. This facilitates that a deterministic latency guarantee is provided during packet forwarding.

In a possible design, the first network node obtains a service flow, and sends a forwarding latency requirement of the service flow and a destination address of the service flow to a controller, to trigger the controller to determine, based on the forwarding latency requirement and the destination address, a forwarding path for forwarding the service flow and a label stack corresponding to the forwarding path, where the packet is a packet in the service flow. The first network node receives the label stack that is sent by the controller and that is corresponding to the forwarding path.

In a possible design, the first network node obtains the first label stack based on the label stack that is sent by the controller and that is corresponding to the forwarding path. Specifically, the first network node adds, according to a packet sending rate, N to each label that is corresponding to the forwarding path and that is in the label stack to obtain the first label stack, where N is a sequence number of a sent packet minus 1.

In a possible design, the sending, by the first network node to the second network node within a period of time corresponding to the cycle time number, the packet including the second label stack includes: adding, by the first network node, the packet including the second label stack to a packet queue corresponding to the cycle time number, and when the packet queue is a sending queue, sending the packet including the second label stack to the second network node through an outbound interface corresponding to the adjacent segment identifier of the first network node.

According to a third aspect, an embodiment of the present invention provides a packet sending method, where the method includes: receiving, by a second network node, a first packet sent by a first network node, where the packet includes a label stack; obtaining, by the second network node, a top of the label stack; determining that the top of the label stack is an adjacent segment identifier of the second network device, and determining, according to a stored correspondence between an adjacent segment identifier and a cycle time number, a cycle time number corresponding to the adjacent segment identifier; and popping out, by the second network node, the adjacent segment identifier that is of the second network node and that is in the label stack of the first packet, to generate a second packet, and sending the second packet to a next-hop network node of the second network node within a period of time corresponding to the cycle time number.

In a possible design, the sending, by the first network node, the second packet to a next-hop network node of the first network node within a period of time corresponding to the cycle time number includes: adding, by the second network node, the second packet to a packet queue corresponding to the cycle time number, and when the packet queue is a sending queue, sending the second packet to the next-hop network node of the first network node through an outbound interface corresponding to the adjacent segment identifier of the second network node.

According to a fourth aspect, an embodiment of the present invention provides a controller configured to perform the method in any one of the first aspect or the possible implementations of the first aspect. Specifically, the controller includes a unit configured to perform the method in any one of the first aspect or the possible implementations of the first aspect.

According to a fifth aspect, an embodiment of the present invention provides a first network node configured to perform the method in any one of the second aspect or the possible implementations of the second aspect. Specifically, the first network node includes a unit configured to perform the method in any one of the second aspect or the possible implementations of the second aspect.

According to a sixth aspect, an embodiment of the present invention provides a second network node configured to perform the method in any one of the third aspect or the possible implementations of the third aspect. Specifically, the second network node includes a unit configured to perform the method in any one of the third aspect or the possible implementations of the third aspect.

According to a seventh aspect, a controller is provided. The controller includes a processor, a network interface, and a memory. The memory may be configured to store program code. The processor is configured to invoke the program code in the memory to perform the method in any one of the first aspect or the possible implementations of the first aspect. For details, refer to the detailed descriptions in the method examples. Details are not described herein again.

According to an eighth aspect, a first network node is provided. The first network node includes a processor, a network interface, and a memory. The memory may be configured to store program code. The processor is configured to invoke the program code in the memory to perform the method in any one of the second aspect or the possible implementations of the second aspect. For details, refer to the detailed descriptions in the method examples. Details are not described herein again.

According to a ninth aspect, a second network node is provided. The second network node includes a processor, a network interface, and a memory. The memory may be configured to store program code. The processor is configured to invoke the program code in the memory to perform the method in any one of the third aspect or the possible implementations of the third aspect. For details, refer to the detailed descriptions in the method examples. Details are not described herein again.

According to a tenth aspect, a packet sending system is provided. The system includes the controller, the first network node, and the second network node that are provided in the foregoing aspects.

According to an eleventh aspect, a computer storage medium is provided. The computer storage medium is configured to store a computer software instruction used by the foregoing network node or controller, and the computer software instruction includes a program designed to perform the foregoing aspects.

BRIEF DESCRIPTION OF DRAWINGS

FIG. 4 is a schematic diagram of a correspondence between a segment identifier and a cycle time number according to an embodiment of the present invention;

FIG. 5A and FIG. 5B are a schematic flowchart of packet forwarding according to an embodiment of the present invention;

DESCRIPTION OF EMBODIMENTS

The following describes the embodiments of the present invention with reference to accompanying drawings.

Figure 1:
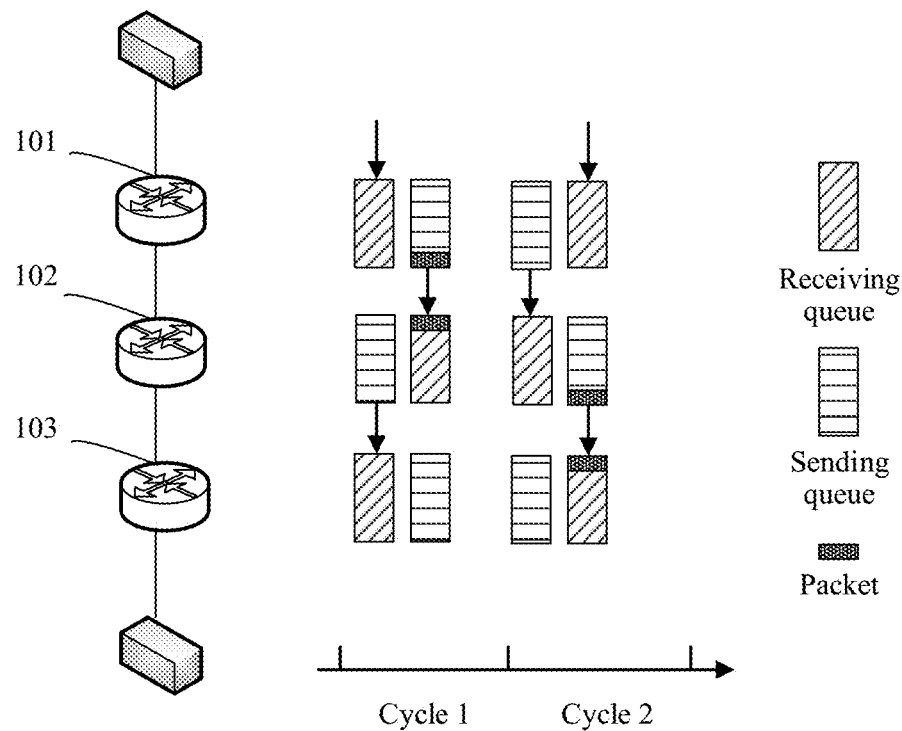
FIG. 1 is a schematic diagram of packet forwarding through CQF according to an embodiment of the present invention.

CQF is a queue management method that uses two queues to send a packet alternately. Each network node has an independent period of time for sending a packet. Packets in a same period of time are guaranteed with sufficient bandwidth through resource reservation, and packets in different periods of time are isolated. A packet has a deterministic latency when being forwarded by each network node. As shown in FIG. 1, each network node has two packet queues: a packet receiving queue and a packet sending queue. The packet receiving queue is used to receive a packet sent by a previous-hop network node to a current network node. The packet sending queue is used to send the cached packet to a next-hop network node, and the queue may not receive the packet or may receive the packet. The packet receiving queue and the packet sending queue may exchange roles. When the packet receiving queue changes into the packet sending queue, the packet received by the packet receiving queue is sent to the next-hop network node. Each network node has a clock. The packet receiving queue and the packet sending queue exchange the roles after a fixed-length period of time. In other words, the packet receiving queue changes into the packet sending queue, and the packet sending queue changes into the packet receiving queue. The fixed-length period of time is defined as a cycle time that is referred to as a cycle for short. The network node records a period of time in cycles. A length of the cycle of each network node is the same, and a start time point and an end time point of cycles of different network nodes need to be the same. The packet receiving queue and the packet sending queue exchange the roles at an interval of cycles.

Referring to FIG. 1, FIG. 1 is a schematic diagram of packet forwarding performed by a network node through CQF. In a cycle 1, a packet sending queue of a node 101 sends a packet to a packet receiving queue of a node 102. When a period of time changes from the cycle 1 to a cycle 2, the packet receiving queue of the node 102 changes to the packet sending queue. In the cycle 2, the packet sending queue of the node 102 sends the packet to the packet receiving queue of a node 103. In the process in which the packet is forwarded from the node 101 to the node 103, a maximum packet forwarding latency is (N+1)×cycle, where N is a quantity of intermediate nodes on a forwarding path. In a scenario shown in FIG. 1, the packet forwarding latency is 2×cycle when the packet is forwarded from the node 101 to the node 103. Because impact of a link between nodes is not considered in the process of calculating the packet forwarding latency, the manner of obtaining the maximum packet forwarding latency is inaccurate. For example, when the packet is forwarded by the node 101 to the node 102 in the cycle 1, and if a link latency between the node 101 and the node 102 is greater than a length of one cycle, in this case, it cannot be ensured that the packet is forwarded to the node 102 within the cycle 1. Therefore, the CQF cannot accurately provide a deterministic latency guarantee during packet forwarding.

Figure 2:
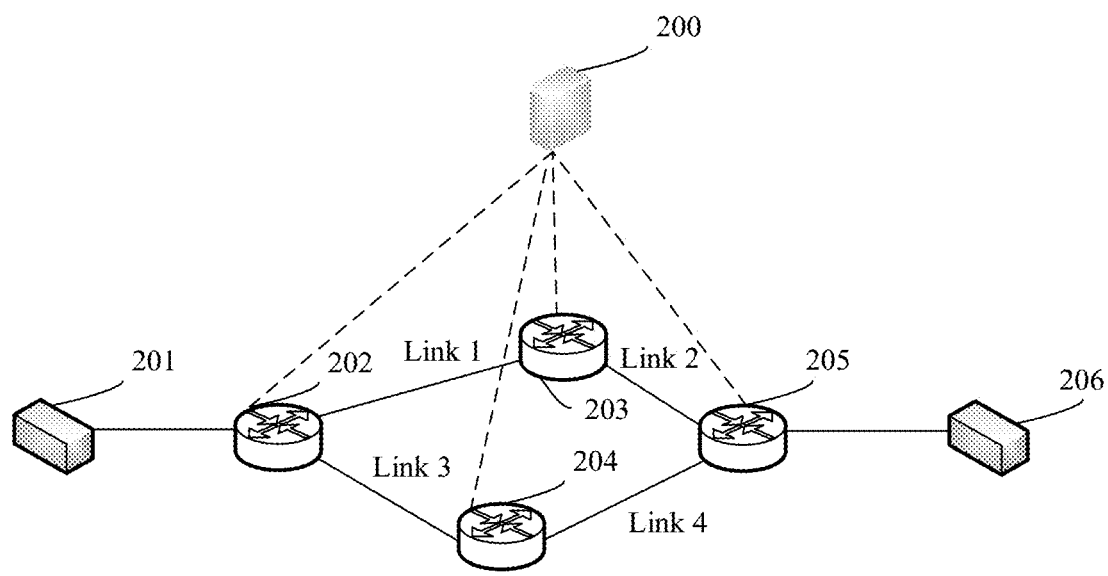
FIG. 2 is a schematic diagram of an application scenario of packet forwarding according to an embodiment of the present invention.

FIG. 2 is a schematic diagram of a network scenario of a packet sending method according to an embodiment of the present invention. The application scenario includes: a controller 200, a transmit end 201, a receive end 206, a network node 202, a network node 203, a network node 204, and a network node 205. The controller 200 is a controller in a software-defined network (software defined network, SDN) architecture, and is configured to implement traffic control and manage nodes in a network. In the scenario shown in FIG. 2, the controller 200 controls and manages the network node 202, the network node 203, the network node 204, and the network node 205. A network in which the network node 202, the network node 203, the network node 204, and the network node 205 are located is a segment routing (segment routing, SR) network, and the network node 202, the network node 203, the network node 204, and the network node 205 all support an SR function. The transmit end 201 and the receive end 206 may be user equipments, for example, a mobile phone or a personal computer. The network node 202, the network node 203, the network node 204, and the network node 205 may be routers, switches, or the like. A link between the network node 202 and the network node 203 is a link 1, a link between the network node 203 and the network node 204 is a link 2, a link between the network node 202 and the network node 204 is a link 3, and a link between the network node 204 and the network node 205 is a link 4.

In the embodiments of the present invention, the network node may be a specific network device, for example, a router or a switch.

Figure 3:
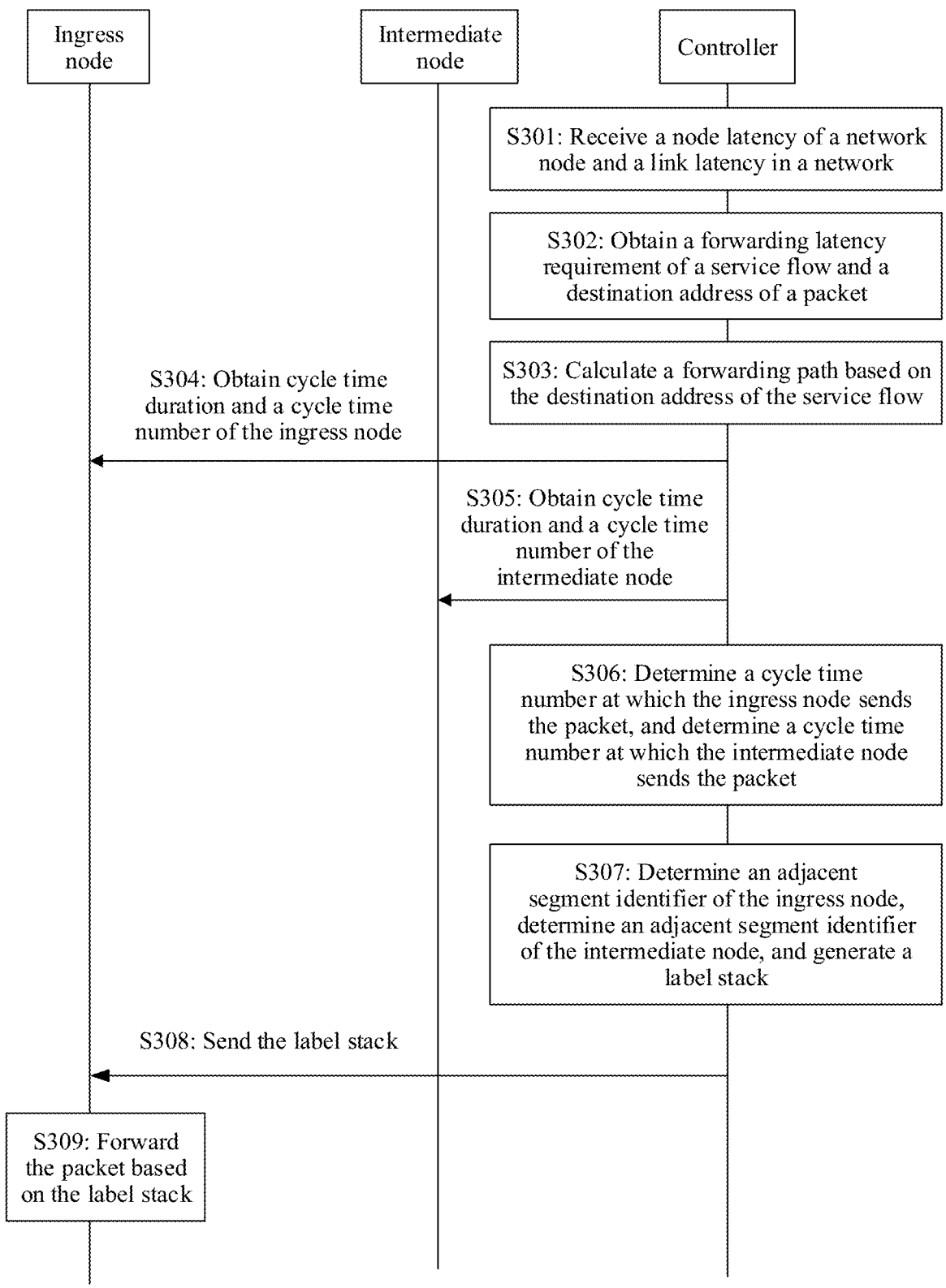
FIG. 3 is a schematic flowchart of packet forwarding according to an embodiment of the present invention.

With reference to the network scenario shown in FIG. 2, referring to FIG. 3, an embodiment of the present invention provides a packet sending method. The method includes the following steps.

S301: A controller receives a node latency of a network node in a network and a link latency in the network. The node latency includes a packet processing latency and a packet sending latency of the node. For example, the controller 200 separately receives a node latency of the network node 202, the network node 203, the network node 204, and the network node 205. The link latency includes a latency between network nodes in the network, for example, latencies of a link 1, a link 2, a link 3, and a link 4 in FIG. 2.

In an example, the packet processing latency of the network node is an average processing latency or a maximum processing latency of a processed packet. The packet sending latency is an average sending latency or a maximum sending latency of a packet sent by the network node. The link latency of the link 1 is an average forwarding latency or a maximum forwarding latency at which a packet is forwarded from the network node 202 to the network node 203; the link latency of the link 2 is an average forwarding latency or a maximum forwarding latency at which the packet is forwarded from the network node 203 to the network node 204; the link latency of the link 3 is an average forwarding latency or a maximum forwarding latency at which the packet is forwarded from the network node 202 to the network node 204; and the link latency of the link 4 is an average forwarding latency or a maximum forwarding latency at which the packet is forwarded from the network node 204 to the network node 205.

S302: The controller obtains a forwarding latency requirement of a service flow and a destination address of the service flow. The service flow is a service flow that is forwarded through the network managed by the controller. In the scenario shown in FIG. 2, a packet in the service flow needs to be forwarded through the SR network.

In an example, the forwarding latency requirement of the service flow and the destination address of the service flow may be sent by an ingress node of the SR network to the controller. For example, the network node 202 in FIG. 2 sends, to the controller 200, the destination address of the service flow and the latency requirement of the service flow that needs to be forwarded.

In an example, the forwarding latency requirement of the service flow and the destination address of the service flow may be sent by the access end 201 to the controller. When needing to send the service flow through the network managed by the controller, the access end 201 sends the forwarding latency requirement of the service flow and the destination address of the service flow to the controller.

In an example, the forwarding latency requirement of the service flow may be a latency range. For example, the latency requirement is that a packet forwarding latency ranges from 10 milliseconds (ms) to 15 ms, or the forwarding latency requirement is a specific latency, for example, the forwarding latency is 20 ms.

S303: The controller calculates a forwarding path based on the destination address of the service flow, where a latency of the forwarding path meets the forwarding latency requirement of the service flow. The forwarding path includes an ingress node, an intermediate node, and an egress node. The latency of the forwarding path includes a node latency of the ingress node of the forwarding path, a node latency of the intermediate node, and a link latency of a link between the ingress node and the egress node.

With reference to FIG. 2, for example, the destination address of the service flow is an address of the receive end 206, and the controller 200 calculates the forwarding path in the SR network based on the destination address. There are two paths that can reach the receive end 206: a path 1 and a path 2. The path 1 passes through the network node 202, the network node 203, and the network node 205, and the path 2 passes through the network node 202, the network node 204, and the network node 205. If a latency of the path 1 meets the forwarding latency requirement of the service flow, and a latency of the path 2 does not meet the forwarding latency requirement of the service flow, the controller selects the path 1 as the forwarding path for forwarding the service flow. An ingress node of the path 1 is the network node 202, an intermediate node of the path 1 is the network node 203, and an egress node of the path 1 is the network node 205.

S304: The controller obtains cycle time duration of an ingress node of the forwarding path and a cycle time number of the ingress node at a current time point of the controller. In the embodiments of this application, the cycle time duration is duration occupied by the cycle time. The current time point of the controller is a time point at which the controller obtains the cycle time number of the ingress node.

S305: The controller obtains cycle time duration of an intermediate node of the forwarding path and a cycle time number of the intermediate node at a current time point of the controller. There may be one or more intermediate nodes. The current time point of the controller is a time point at which the controller obtains the cycle time number of the intermediate node.

Cycle time duration of each network node may be the same or may be different. This is not specifically limited in the embodiments of this application. A cycle time is a unit of process scheduling of a network node, and sending of a packet in a queue is completed once in one cycle time. The cycle time of each network node is numbered starting from a time point when the network node is started, and increases gradually. It can be learned that in the embodiments of the present invention, the cycle time duration of each network node may be the same or may be different, and a start time point and an end time point of the cycle time of each network node may be different. This avoids configuration complexity of the network node, simplifies device management workloads, and provides high packet forwarding efficiency.

With reference to FIG. 2, for example, cycle time duration of the network node 202 and cycle time duration of the network node 203 are separately obtained by the controller. The cycle time duration of the network node 202 is first duration, for example, 10 milliseconds (ms), and the cycle time duration of the network node 203 is second duration, for example, 12 ms. A current cycle time number of the network node 202 is a first number, for example, 124, and a current cycle time number of the network node 203 is a second number, for example, 156.

S306: The controller determines a cycle time number at which the ingress node sends a packet, and determines a cycle time number at which the intermediate node sends the packet, where the packet belongs to the service flow. Optionally, the packet may be a first packet in the service flow, or any packet in the service flow.

After obtaining the cycle time duration and the current cycle time number of the ingress node, the controller may select a time point as a time point at which the ingress node sends the packet, and determine a cycle time number corresponding to the time point. For example, the current cycle time number of the ingress node is k, for example, k=1001, and the cycle time duration is m, for example, m=10 ms. The controller chooses to wait t seconds before allowing the ingress node to start to send the packet, for example, t=50 seconds. The cycle time number L corresponding to sending of the packet is calculated according to the following formula:

$$L=k+t\times 1000/m.$$

That is, L=1001+50×1000/10=6001.

The t seconds may be obtained from a time point of calculating the waiting t seconds by the controller and a time point at the controller at which the ingress node forwards the packet.

After determining the cycle time number of the ingress node, the controller determines the cycle time number of the intermediate node. The controller determines a cycle time number of a first intermediate node of the forwarding path, where the first intermediate node is a next-hop node of the ingress node. For example, in FIG. 2, if the node 202 is the ingress node, the node 203 is the next-hop node of the node 202. The controller calculates the cycle time number of the first intermediate node in the following manner.

Duration t of the packet before the intermediate node enqueues is calculated according to the following formula:

$$t=t1+t2+t3.$$

t1 is a time length when the packet is forwarded by the ingress node at the cycle time number L;

t2 is a link latency of a link between the ingress node and the intermediate node; and t3 is a maximum packet processing latency of the intermediate node.

Based on the duration t before enqueue the packet at the intermediate node, a number of cycle time when last enqueue the packet at the intermediate node is calculated. For example, a current cycle time number of the intermediate node is a, for example, a=2001, cycle time duration is m, for example, m=20 ms, and the foregoing calculated latest enqueuing duration t of the intermediate node is 20 seconds. A cycle time number B corresponding to sending the packet by the corresponding intermediate node is calculated according to the following formula:

$$B=a+t\times 1000/m=3001.$$

The controller calculates, in the following manner, a cycle time number of an intermediate node (a non-first intermediate node) other than the first intermediate node.

Duration t of the packet before the non-first intermediate node enqueues is calculated according to the following formula:

$$t=t1+t2+t3+t4.$$

t1 is the time length when the packet is forwarded by the ingress node at the cycle time number L;

t2 is a link latency of a link between the ingress node and the non-first intermediate node;

t3 is a maximum packet processing latency of the non-first intermediate node; and t4 is a sum of node latencies of intermediate nodes that are between the ingress node and the non-first intermediate node.

S307: Determine an adjacent segment identifier of the ingress node, determine an adjacent segment identifier of the intermediate node, and generate a label stack. The label stack sequentially includes, from top of the stack to bottom of the stack, the adjacent segment identifier of the ingress node and the adjacent segment identifier of the intermediate node.

S308: The controller sends the label stack to the ingress node.

In an example, an outbound interface of each node of the forwarding path may be corresponding to a plurality of adjacent segment identifiers, and a correspondence between each adjacent segment identifier and a cycle time number is established. Referring to FIG. 4, for example, adjacent segment identifiers corresponding to an outbound interface of the ingress node of the forwarding path are from SID 1 to SID 10. The 10 adjacent segment identifiers are corresponding to a link that is corresponding to an outbound interface and that is forwarded by the ingress node via the forwarding path, for example, the link 1 in FIG. 2. Each segment identifier (segment identifier, SID) of a port is corresponding to a plurality of cycle numbers, and a SID corresponding to the port or the link may also be referred to as an adjacent segment identifier. The SID may be an MPLS label. To limit a quantity of SIDs, on a premise that no confusion is caused, a correspondence between a cycle number and a SID may be a many-to-one correspondence. For example, cycle numbers corresponding to the SID 1 is M, where M is an arithmetic sequence whose first term is 0001 and whose common difference is 10. For example, the cycle numbers corresponding to the SID 1 are 0001, 0011, 0021, 0031, and the like. Cycle numbers corresponding to the SID 2 is N, where N is an arithmetic sequence whose first term is 0002 and whose common difference is 10. For example, the cycle numbers corresponding to the SID 2 are 0002, 0012, 0022, 0032, and the like. In this embodiment of the present invention, 10 SIDs may be used to represent cycle numbers. Cycle numbers on a node increase as a time elapses, and SIDs used for every 10 cycle numbers are cyclically used.

In an example, after a correspondence between each adjacent segment identifier and cycle numbers is established, the ingress node and the intermediate node separately send the correspondence to the controller, or the controller may actively obtain the correspondence between an adjacent segment identifier and cycle numbers from each forwarding node.

The controller may determine, based on the calculated cycle time number of each node and the correspondence between an adjacent segment identifier and cycle numbers, SIDs that need to be used, and then form a label stack by using the SIDs of each node. The label stack sequentially includes, from top of the stack to bottom of the stack, SIDs of the ingress node and the intermediate node of the forwarding path. For example, with reference to FIG. 2, the packet passes through the node 202 and the node 203 to arrives at the node 205, and a label stack is <SID 2, SID 4>, where the SID 2 is an adjacent segment identifier of the node 202, and the SID 4 is an adjacent segment identifier of the node 203. In this embodiment of the present invention, different nodes may use a same adjacent segment identifier. In other words, an adjacent segment identifier of a node is locally valid. For example, the adjacent segment identifiers corresponding to the outbound interface of the ingress node of the forwarding path are from SID 1 to SID 10, and adjacent segment identifiers corresponding to an outbound interface of the intermediate node of the forwarding path may also be from SID 1 to SID 10. Corresponding to the scenario shown in FIG. 2, adjacent segment identifiers of the link 1 corresponding to an outbound interface of the node 202 are from SID 1 to SID 10, and adjacent segment identifiers of the link 2 corresponding to an outbound interface of the node 203 may also be from SID 1 to SID 10. The controller sends the label stack to the ingress node, and after receiving the label stack, the ingress node performs processing according to step S309.

S309: The ingress node forwards the packet based on the label stack.

The ingress node pushes the label stack into a packet header of a service packet, where the service packet is a packet in the service flow. When it is determined that a top of the label stack is the adjacent segment identifier of the ingress node, a cycle time number at which the service packet is sent is determined according to the correspondence between an adjacent segment identifier and a cycle time number, and then the top is popped out. A service packet including remaining labels in the label stack is sent to the intermediate node within a period of time corresponding to the cycle time number. For example, when determining that the top of the label stack is the SID 2, the ingress node determines corresponding cycle time numbers based on the SID 2. For example, if the determined cycle time numbers are 0002, 0012, 0022, 0032, and the like, a cycle time number closest to a current cycle time number of the ingress node is selected as the cycle time number at which the service packet is sent. For example, if the current cycle time number of the ingress node is 0030, the selected cycle time number is 0032. After determining the cycle time number at which the service packet is sent, the ingress node adds the service packet to a packet queue corresponding to the cycle time number. The packet queue may be a packet receiving queue or a packet sending queue.

In an example, after the ingress node adds the service packet to the packet queue corresponding to the cycle time, and when the packet queue is the sending queue, the service packet is sent to a next-hop node of the ingress node through an outbound interface corresponding to the adjacent segment identifier of the ingress node.

Figure 5A:
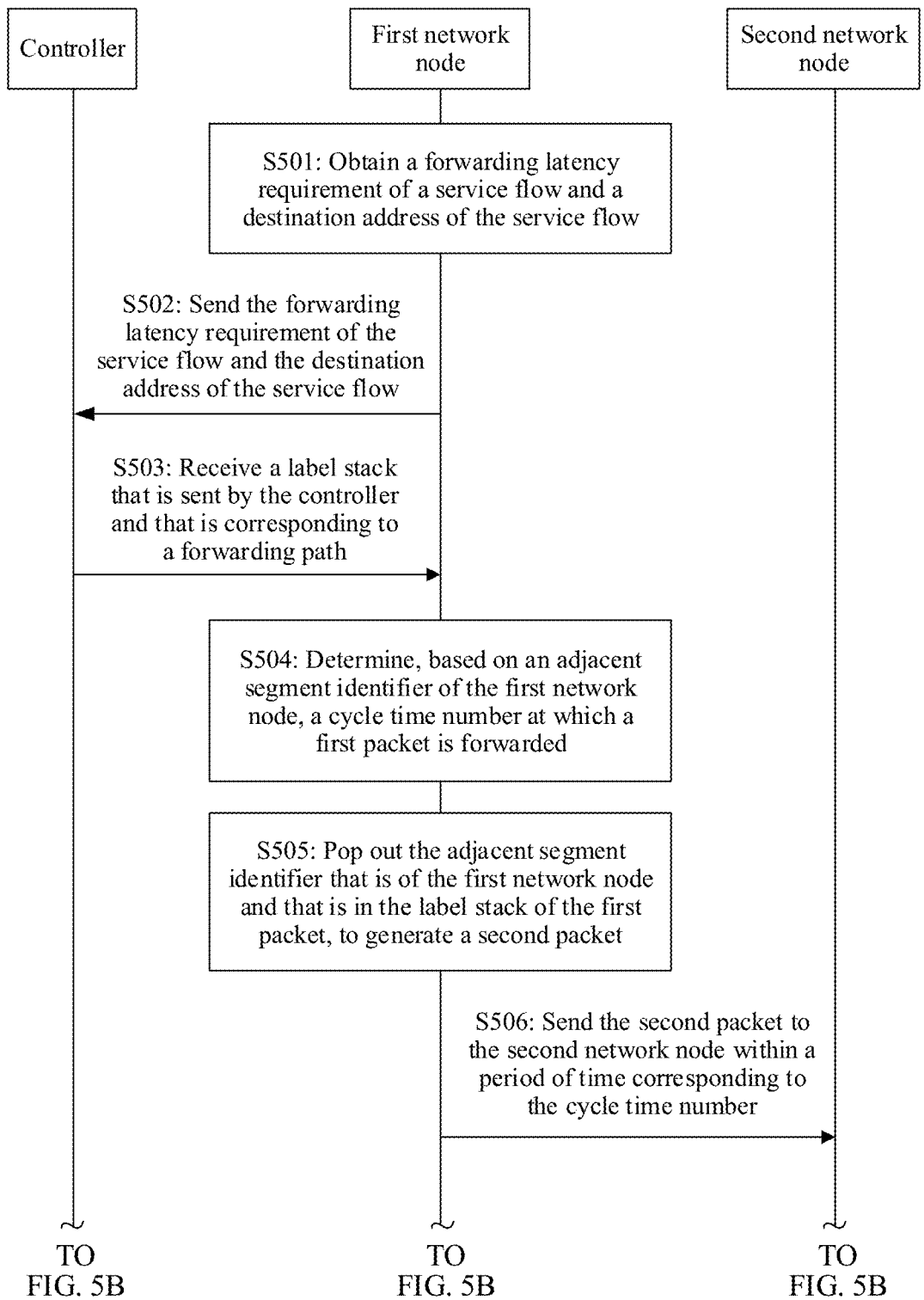

With reference to the network scenario shown in FIG. 2, referring to FIG. 5A and FIG. 5B, an embodiment of the present invention provides a packet sending method. The method includes the following steps.

S501: A first network node obtains a forwarding latency requirement of a service flow and a destination address of the service flow. The service flow is a service flow generated by the first network node, or is a service flow received by the first network node from another device. The first network node is an ingress node of the forwarding path, for example, the ingress node in the embodiment shown in FIG. 3.

S502: The first network node sends the forwarding latency requirement of the service flow and the destination address of the service flow to a controller, to trigger the controller to determine, based on the forwarding latency requirement and the destination address, a forwarding path for forwarding the service flow and a first label stack corresponding to the forwarding path.

S503: The first network node receives the first label stack that is sent by the controller and that is corresponding to the forwarding path, where the first label stack includes an adjacent segment identifier of the first network node and an adjacent segment identifier of a second network node, and the second network node is an intermediate node of the forwarding path. For example, the intermediate node is the intermediate node shown in the embodiment in FIG. 3.

S504: The first network node pushes the first label stack into a packet header of a first packet, where a top of the first label stack is an adjacent segment identifier of the first network node; and the first network node determines, based on the adjacent segment identifier of the first network node, cycle time number for sending the first packet. The first packet is a packet in the service flow.

S505: The first network node pops out the adjacent segment identifier that is of the first network node and that is in the first label stack in the packet header of the first packet, to generate a second packet. The first label stack from which the adjacent segment identifier of the first network node is popped out is a second label stack.

S506: The first network node sends the second packet to the second network node within a period of time corresponding to the cycle time number.

S507: The second network node receives the second packet, determines that a top that is of a second label stack and that is included in the second packet is the adjacent segment identifier of the second network device, and determines, according to a stored correspondence between an adjacent segment identifier and a cycle time number, cycle time corresponding to the adjacent segment identifier.

S508: The second network node pops out the adjacent segment identifier that is of the second network node and that is in the second packet, to generate a third packet, and sends the third packet to a next-hop network node of the second network node within a period of time corresponding to the cycle time number.

In an example, the first network node may perform the steps performed by the ingress node in the embodiment shown in FIG. 3. For detailed step descriptions, refer to the embodiment shown in FIG. 3. The second network node may perform the steps performed by the intermediate node in the embodiment shown in FIG. 3. For detailed step descriptions, refer to FIG. 3.

In an example, after obtaining the first label stack from the controller, the first network node may generate, based on the first label stack, a label stack used to forward a packet that is subsequent to the first packet in the service flow. For example, when the first label stack corresponding to the first packet is <SID 2, SID 4>, where the SID 2 is the adjacent segment identifier of the first network node, and the SID 4 is the adjacent segment identifier of the second network node, one adjacent segment identifier of each node is corresponding to a plurality of cycle time numbers. When a packet in the service flow is sent based on a duration interval of cycle time, a label stack corresponding to a first packet that is subsequent to the first packet in the service flow is <SID 3, SID 5>, and a label stack corresponding to a second packet that is subsequent to the first packet in the service flow is <SID 4, SID 6>, namely, a label stack of a packet that is subsequent to the first packet generated in a manner of a serial number of SID plus 1. When a SID of a network node in a label stack changes to a SID 10, a SID of a next label stack changes to a SID 1. In other words, SIDs are renumbered at an interval of 10.

Figure 6:
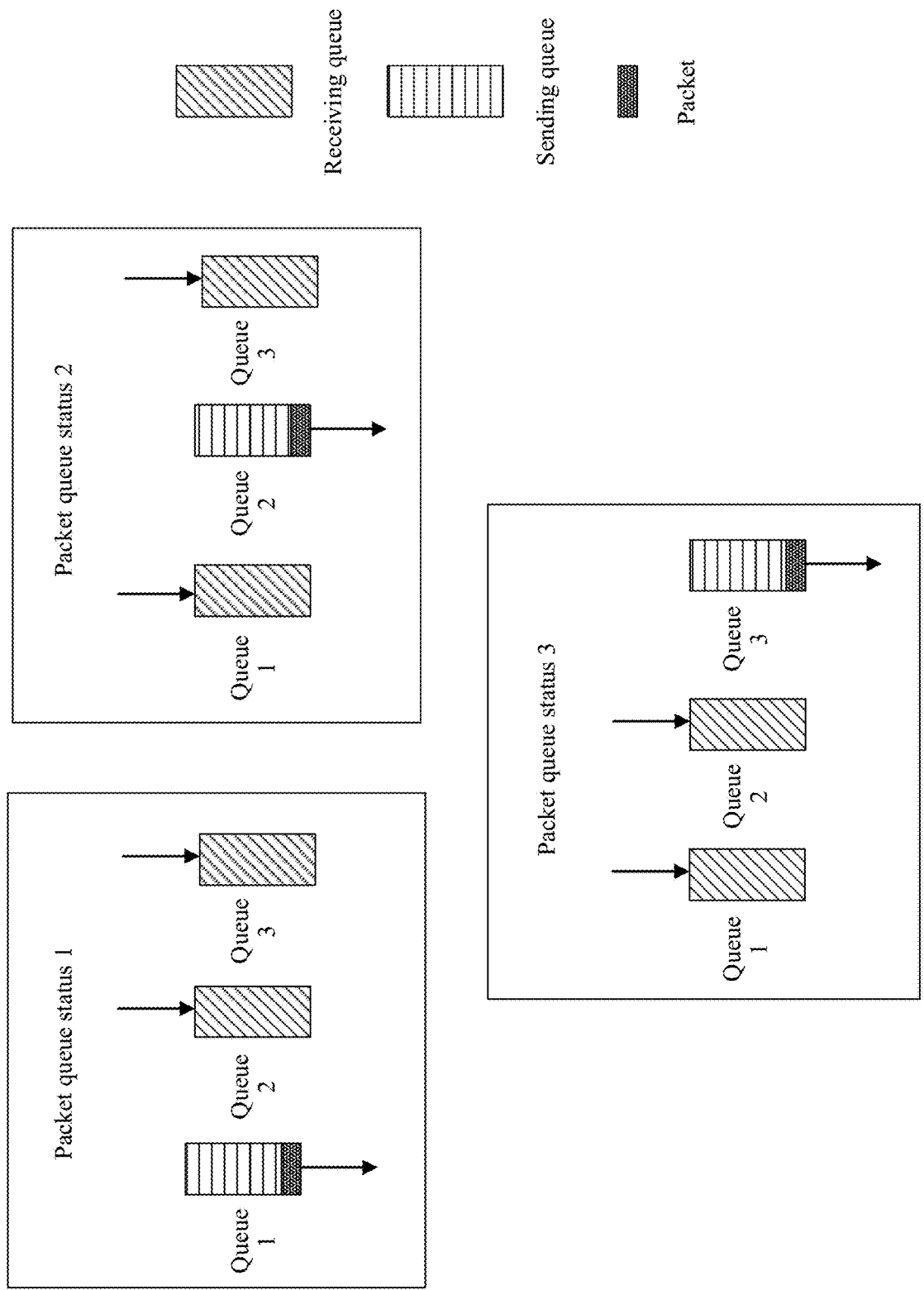
FIG. 6 is a schematic diagram of a packet queue according to an embodiment of the present invention.

In an example, an outbound interface of the first network node is corresponding to three packet queues, where two packet queues are packet receiving queues, and one packet queue is a packet sending queue. Referring to FIG. 6, a packet queue of the first network node at cycle time 1 is in a packet queue status 1; the packet queue at cycle time 2 is in a packet queue status 2; and the packet queue at cycle time 3 is in a packet queue status 3. In the packet queue status 1, a queue 1 is a sending queue, and a queue 2 and a queue 3 are packet receiving queues. In the packet queue status 2, the queue 2 is the sending queue, and the queue 1 and the queue 3 are the packet receiving queues. In the packet queue status 3, the queue 3 is the sending queue, and the queue 1 and the queue 2 are the packet receiving queues. A packet queue status is alternately switched according to the three statuses in FIG. 6. For example, when a cycle time numbers are 1, 4, 7, 10, and the like, the packet queue is in the packet queue status 1; when a cycle time numbers are 2, 5, 8, 11, and the like, the packet queue is in the packet queue status 2; and when a cycle time numbers are is 3, 6, 9, 12, and the like, the packet queue is in the packet queue status 3. Each queue is corresponding to one cycle time sequence. For example, a cycle time sequence of the queue 1 is 1, 4, 7, 10, and the like, a cycle time sequence of the queue 2 is 2, 5, 8, 11, and the like, and a cycle time sequence of the queue 3 is 3, 6, 9, 12, and the like. In other words, a cycle time number sequence corresponding to each queue is an arithmetic sequence whose common difference is 3. When the first network node determines that the cycle time for sending the first packet is the cycle time 5, and determines that a current cycle time number of the first network node is 4, it is determined that a current packet queue status is the packet queue status 1. The first packet from which the adjacent segment identifier of the first network node is popped out is added to the packet queue 2. When the cycle time of the first network node changes to the cycle time 5, the packet queue status is in the status 2, and the packet is sent to the second network node through the packet queue 2.

In an example, an outbound interface of the second network node is also corresponding to the three packet queues shown in FIG. 6, and a change of the packet queue status is shown in FIG. 6. When the second network node receives the second packet at the cycle time 6 of the second network node, and determines, based on the label stack of the second packet, that the second network node needs to send the second packet out at the cycle time 8, the second packet is added to the queue 2. In this case, the packet queue status is in the status 3. When a cycle time number of the second network node changes to 8, in other words, the packet queue status is in the status 2, a status of the queue 2 is in a packet sending status. The second network node sends the second packet to a next-hop node of the second network node through the packet queue 2.

A plurality of packet queues are set in a network node, to improve reliability of packet forwarding. For example, when a packet arrives at the second network node, the packet receiving queue of the second network node is full. In this case, a queue overflow occurs, and the packet cannot be normally forwarded. A quantity of queues for receiving the packet is increased, so that the packet may be cached when the packet arrives at the network node in advance. The packet is sent when cycle time arrives, so that the reliability of packet sending is improved.

Figure 7:
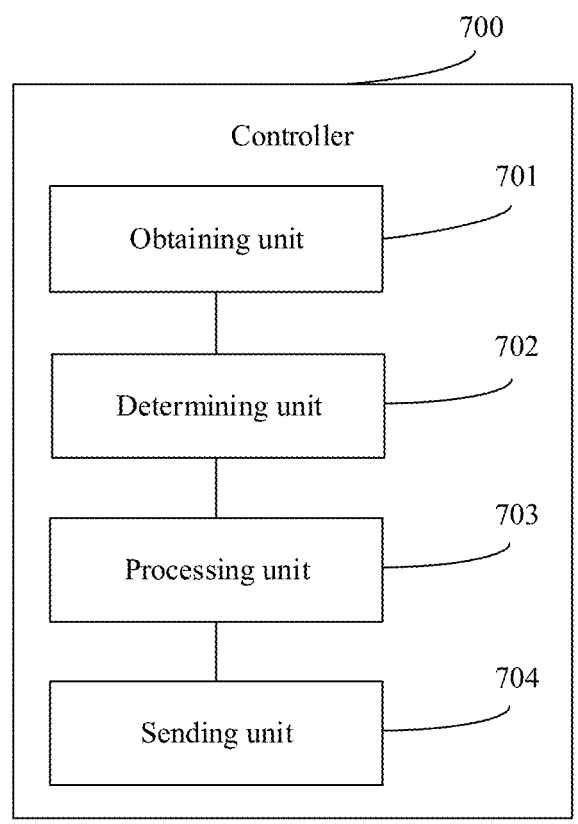
FIG. 7 is a schematic structural diagram of a controller according to an embodiment of the present invention.

FIG. 7 is a possible schematic structural diagram of a controller related in the foregoing embodiments. The controller 700 may implement functions of the controller in the embodiment shown in FIG. 3 or FIG. 5A and FIG. 5B. Referring to FIG. 7, the controller 700 includes an obtaining unit 701, a determining unit 702, a processing unit 703, and a sending unit 704. These units may perform corresponding functions of the controller in the foregoing method embodiment. The obtaining unit 701 is configured to support the controller 700 in performing the process S301 and the process S302 in FIG. 3. The determining unit 702 is configured to support the controller 700 in performing process S303 and the process S306 in FIG. 3. The sending unit 704 is configured to support the controller 700 in performing the process S308 in FIG. 3. The processing unit 703 is configured to support the controller 700 in performing the process S307 in FIG. 3 and/or another process performed by the controller in the technology described in this specification. For example, the obtaining unit 701 is configured to perform various information obtaining operations performed by the node in the foregoing method embodiment. The determining unit 702 is configured to perform the determining action performed by the controller in the foregoing method embodiment. The sending unit 704 is configured to perform various information sending operations performed by the controller in the foregoing method embodiment. The processing unit 703 is configured to perform processing of the controller in the foregoing method embodiment other than the determining action, the information receiving, and the information sending. For example, the obtaining unit 701 is configured to obtain a forwarding latency requirement of a service flow and a destination address of the service flow. The determining unit 702 is configured to determine, based on the forwarding latency requirement and the destination address, a forwarding path for forwarding the service flow. A latency of the forwarding path meets the forwarding latency requirement of the service flow, and the forwarding path passes through a first network node and a second network node. The first network node is an ingress node of the forwarding path, and the second network node is an intermediate node of the forwarding path. The determining unit 702 is configured to: determine a first cycle time number at which the first network node forwards a packet and a second cycle time number at which the second network node forwards the packet, and determine a first adjacent segment identifier corresponding to the first cycle time number and a second adjacent segment identifier corresponding to the second cycle time number. The packet is a packet in the service flow. The processing unit 703 is configured to generate a label stack of the forwarded packet, where the label stack includes the first adjacent segment identifier and the second adjacent segment identifier. The sending unit 704 is configured to send the label stack to the first network node, where the label stack is used to indicate the first network node to forward the packet via the forwarding path within a period of time corresponding to the first cycle time number. For a specific execution process, refer to the detailed descriptions of corresponding steps in the foregoing embodiment shown in FIG. 3 or FIG. 5A and FIG. 5B. Details are not described herein again.

Figure 8:
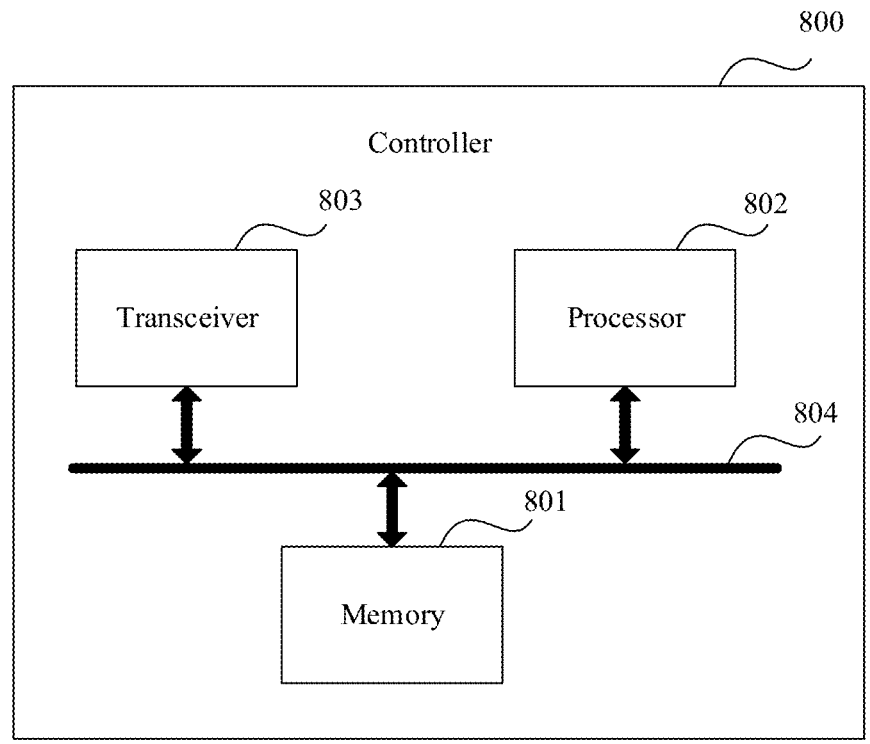
FIG. 8 is a schematic structural diagram of a controller according to an embodiment of the present invention.

FIG. 8 is a possible schematic structural diagram of a controller related in the foregoing embodiments. The controller 800 includes a processor 802, a transceiver 803, a memory 801, and a bus 804. The processor 802, the transceiver 803, and the memory 801 are connected to each other through the bus 804. The bus 804 may be a peripheral component interconnect (peripheral component interconnect, PCI for short) bus, an extended industry standard architecture (extended industry standard architecture, EISA for short) bus, or the like. The bus may be classified into an address bus, a data bus, a control bus, and the like. For ease of representation, only one thick line is used to represent the bus in FIG. 8, but this does not mean that there is only one bus or only one type of bus. The controller 800 may implement functions of the controller in the embodiment shown in FIG. 3 or FIG. 5A and FIG. 5B. The processor 802 and the transceiver 803 may perform corresponding functions of the controller in the foregoing method examples. The transceiver 803 is configured to support the controller 800 in performing the processes S301 and S302 in FIG. 3. The processor 802 is configured to support the controller 800 in performing the process S307 in FIG. 3 and/or another process performed by the controller in the technology described in this specification. The memory 801 is configured to store program code and data of the controller 800. For a specific execution process, refer to the detailed descriptions of corresponding steps in the foregoing embodiment shown in FIG. 3 or FIG. 5A and FIG. 5B. Details are not described herein again.

Figure 9:
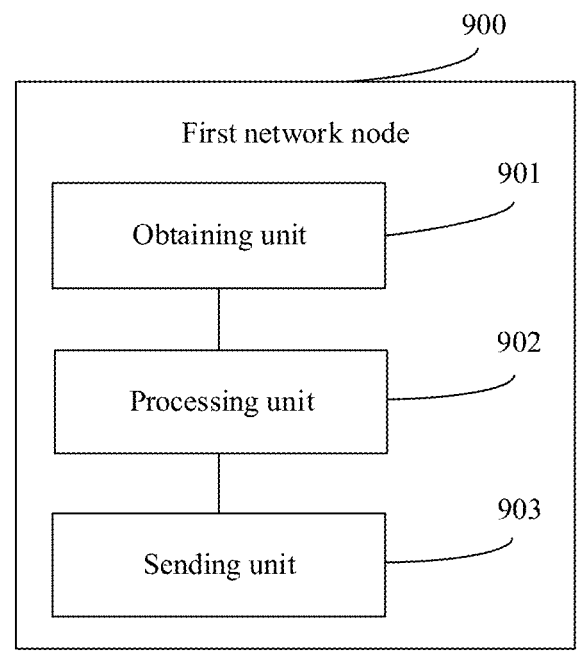
FIG. 9 is a schematic structural diagram of a first network node according to an embodiment of the present invention.

FIG. 9 is a possible schematic structural diagram of a first network node related in the foregoing embodiments. The first network node may implement functions of the ingress node in the embodiment shown in FIG. 3 or functions of the first network node in the embodiment shown in FIG. 5A and FIG. 5B. Referring to FIG. 9, the first network node 900 includes an obtaining unit 901, a processing unit 902, and a sending unit 903. These units may perform corresponding functions of the first network node in the foregoing method examples. The obtaining unit 901 is configured to support the first network node 900 in performing the process S501 in FIG. 5A and FIG. 5B. The sending unit 903 is configured to support the first network node 900 in performing the process S502 and the process S506 in FIG. 5A and FIG. 5B. The processing unit 902 is configured to support the first network node 900 in performing the process S504 and the process S505 in FIG. 5A and FIG. 5B, and/or another process performed by the first network node in the technology described in this specification. For example, the obtaining unit 901 is configured to perform various information obtaining operations performed by the first network node in the foregoing method embodiment. The sending unit 903 is configured to perform various information sending operations performed by the first network node in the foregoing method embodiment. The processing unit 902 is configured to perform processing of the first network node in the foregoing method embodiment other than a determining action, the information obtaining, the information receiving, and the information sending. For example, the obtaining unit 901 is configured to obtain a packet, and obtain a first label stack based on the packet. The first label stack is a label stack corresponding to a forwarding path for forwarding the packet, and the first label stack includes an adjacent segment identifier of the first network node and an adjacent segment identifier of a second network node. The first network node is an ingress node of the forwarding path, and the second network node is an intermediate node of the forwarding path. The processing unit 902 is configured to push the first label stack into the packet, where a top of the first label stack is the adjacent segment identifier of the first network node. The processing unit 902 is configured to determine, based on the adjacent segment identifier of the first network node, a cycle time number at which the packet is forwarded, and pop out the adjacent segment identifier that is of the first network node and that is in the first label stack, to obtain a second label stack. The sending unit 903 is configured to send the packet including the second label stack to the second network node within a period of time corresponding to the cycle time number. For a specific execution process, refer to the detailed descriptions of corresponding steps in the foregoing embodiment shown in FIG. 3 or FIG. 5A and FIG. 5B. Details are not described herein again.

It should be noted that, in this embodiment of the present invention, unit division is an example, and is merely a logical function division. In an actual implementation, another division manner may be used. Functional units in the embodiments of the present invention may be integrated into one processing unit, or each of the units may exist alone physically, or two or more units are integrated into one unit.

For example, in the foregoing embodiment, the receiving unit and the sending unit may be a same unit or different units. The integrated unit may be implemented in a form of hardware, or may be implemented in a form of a software functional unit.

Figure 10:
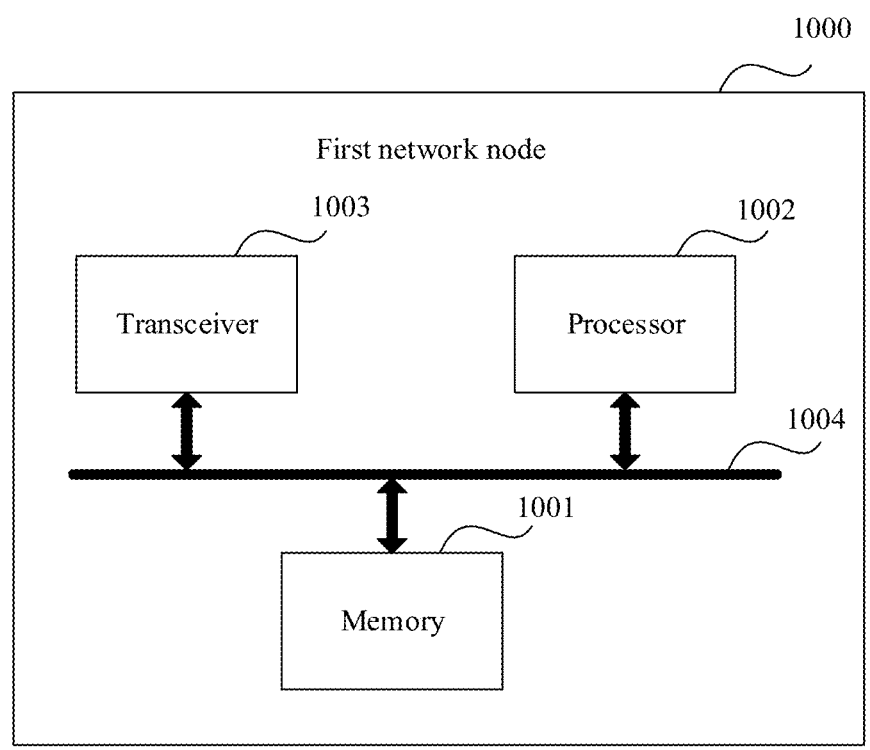
FIG. 10 is a schematic structural diagram of a first network node according to an embodiment of the present invention.

Referring to FIG. 10, a first network node 1000 includes a processor 1002, a transceiver 1003, a memory 1001, and a bus 1004. The transceiver 1003, the processor 1002, and the memory 1001 are connected to each other through the bus 1004. The bus 1004 may be a PCI bus, an EISA bus, or the like. The bus may be classified into an address bus, a data bus, a control bus, and the like. For ease of representation, only one thick line is used to represent the bus in FIG. 10, but this does not mean that there is only one bus or only one type of bus. The first network node 1000 may implement functions of the ingress node in the embodiment shown in FIG. 3 or functions of the first network node in the embodiment shown in FIG. 5A and FIG. 5B. The processor 1102 and the transceiver 1103 may perform corresponding functions of the first network node or corresponding functions of the ingress node in the foregoing method examples. For a specific execution process, refer to the detailed descriptions of corresponding steps in the foregoing embodiment shown in FIG. 3 or FIG. 5. Details are not described herein again.

Figure 11:
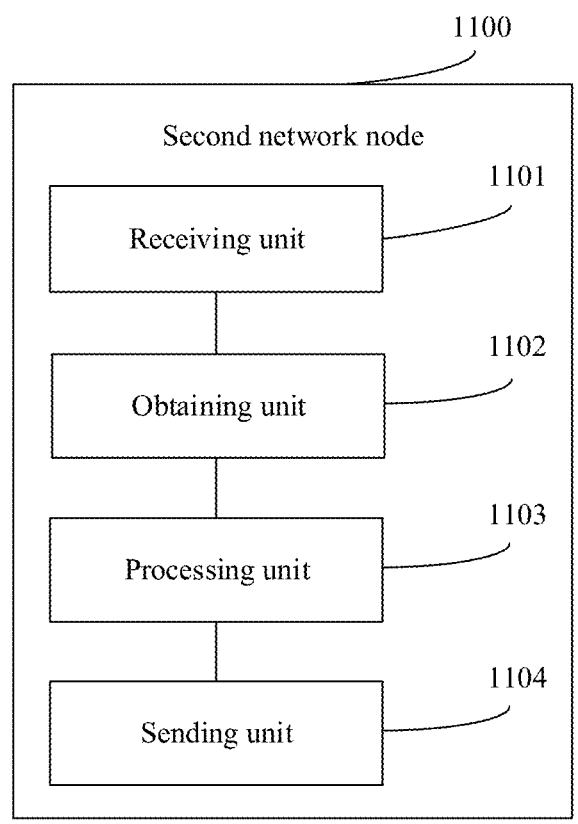
FIG. 11 is a schematic structural diagram of a second network node according to an embodiment of the present invention.

FIG. 11 is a possible schematic structural diagram of a second network node related in the foregoing embodiments. The second network node may implement functions of the ingress node in the embodiment shown in FIG. 3 or functions of the second network node in the embodiment shown in FIG. 5A and FIG. 5B. Referring to FIG. 11, the second network node 1100 includes a receiving unit 1101, an obtaining unit 1102, a processing unit 1103, and a sending unit 1104. These units may perform corresponding functions of the second network node or the intermediate node in the foregoing method examples. The receiving unit 1101 is configured to support the second network node 1100 in performing the process S506 in FIG. 5A and FIG. 5B. The obtaining unit 1102 is configured to support the second network node 1100 in performing the process S507 in FIG. 5A and FIG. 5B. The sending unit 1104 is configured to support the second network node 1100 in performing the process S508 in FIG. 5A and FIG. 5B. The processing unit 1103 is configured to support the second network node 1100 in performing the process S508 in FIG. 5A and FIG. 5B, and/or another process performed by the second network node in the technology described in this specification. For example, the receiving unit 1101 is configured to perform various information receiving operations performed by the second network node in the foregoing method embodiment. The obtaining unit 1102 is configured to perform various information obtaining operations performed by the second network node in the foregoing method embodiment. The sending unit 1104 is configured to perform various information sending operations performed by the second network node in the foregoing method embodiment. The processing unit 1103 is configured to perform processing of the second network node in the foregoing method embodiment other than a determining action, the information obtaining, the information sending, and the information receiving. For example, the receiving unit 1101 is configured to receive a first packet sent by a first network node, where the packet includes a label stack. The obtaining unit 1102 is configured to obtain a top of the label stack. The processing unit 1103 is configured to: determine that the top of the label stack is an adjacent segment identifier of the second network device, determine, according to a stored correspondence between an adjacent segment identifier and a cycle time, a cycle time corresponding to the adjacent segment identifier, and pop out the adjacent segment identifier that is of the second network node and that is in the label stack of the first packet, to generate a second packet. The sending unit 1104 is configured to send the second packet to a next-hop network node of the first network node within a cycle time corresponding to the adjacent segment identifier. For a specific execution process, refer to the detailed descriptions of corresponding steps in the foregoing embodiment shown in FIG. 3 or FIG. 5A and FIG. 5B. Details are not described herein again.

It should be noted that, in this embodiment of the present invention, unit division is an example, and is merely a logical function division. In an actual implementation, another division manner may be used. Functional units in the embodiments of the present invention may be integrated into one processing unit, or each of the units may exist alone physically, or two or more units are integrated into one unit. For example, in the foregoing embodiment, the receiving unit and the sending unit may be a same unit or different units. The integrated unit may be implemented in a form of hardware, or may be implemented in a form of a software functional unit.

Figure 12:
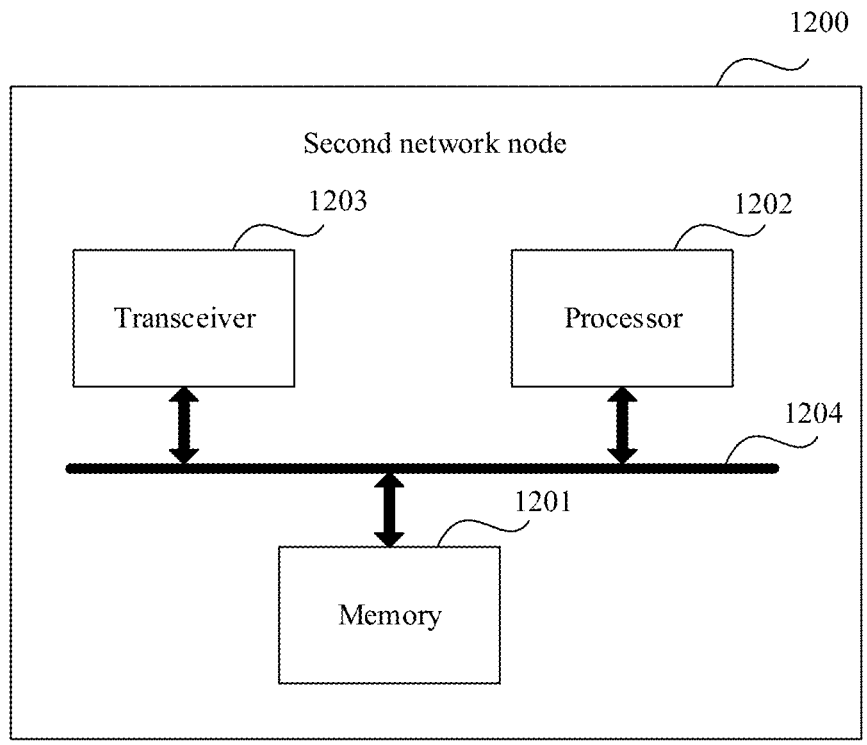
FIG. 12 is a schematic structural diagram of a second network node according to an embodiment of the present invention.

Referring to FIG. 12, a second network node 1200 includes a processor 1202, a transceiver 1203, a memory 1201, and a bus 1204. The transceiver 1203, the processor 1202, and the memory 1201 are connected to each other through the bus 1204. The bus 1204 may be a PCI bus, an EISA bus, or the like. The bus may be classified into an address bus, a data bus, a control bus, and the like. For ease of representation, only one thick line is used to represent the bus in FIG. 12, but this does not mean that there is only one bus or only one type of bus. The second network node 1200 may implement functions of the intermediate node in the embodiment shown in FIG. 3 or functions of the second network node in the embodiment shown in FIG. 5A and FIG. 5B. The processor 1202 and the transceiver 1203 may perform corresponding functions of the second network node or corresponding functions of the intermediate node in the foregoing method examples. For a specific execution process, refer to the detailed descriptions of corresponding steps in the foregoing embodiment shown in FIG. 3 or FIG. 5A and FIG. 5B. Details are not described herein again.

Figure 13:
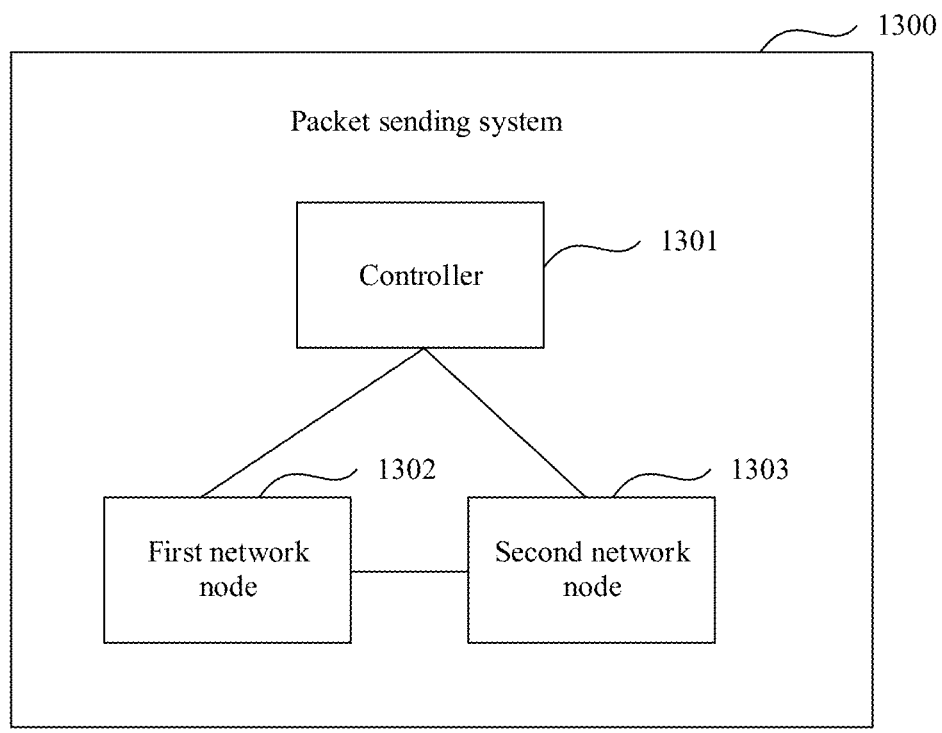
FIG. 13 is a schematic diagram of a packet forwarding system according to an embodiment of the present invention.

Referring to FIG. 13, an embodiment of the present invention provides a packet sending system 1300. The system 1300 is used to implement the packet sending method in the foregoing method embodiment. The system 1300 includes a controller 1301, a first network node 1302, and a second network node 1303. The controller 13201, the first network node 1302, and the second network node 1303 may separately implement functions of the controller, the first network node, and the second network node in the embodiment shown in FIG. 3 or FIG. 5A and FIG. 5B. For a specific execution process, refer to the detailed descriptions of corresponding steps in the foregoing embodiment shown in FIG. 3 or FIG. 5A and FIG. 5B. Details are not described herein again.

An embodiment of the present invention further provides a storage medium, configured to store a software instruction used in the foregoing embodiments. The software instruction includes a program used to perform the method shown in the foregoing embodiments. When the software instruction is executed on a computer or a device, the computer or the device is enabled to perform the method in the foregoing method embodiment.

"First" in the first network node in the embodiments of the present invention is merely used as a name identifier, and does not represent a first place in sequence. For the words "second" and "third", this rule also applies.

It should be noted that any apparatus embodiment described above is merely an example. The units described as separate parts may or may not be physically separate, and parts displayed as units may or may not be physical units, may be located in one position, or may be distributed on a plurality of network units. Some or all the modules may be selected according to actual needs to achieve the objectives of the solutions of the embodiments. In addition, in the accompanying drawings of the embodiments of the first network node or the controller provided by the present invention, connection relationships between modules indicate that the modules have communication connections with each other, and the communication connection may be specifically implemented as one or more communications buses or signal lines. A person of ordinary skill in the art may understand and implement the embodiments of the present invention without creative efforts.

Methods or algorithm steps described in combination with the content disclosed in the embodiments of the present invention may be implemented by hardware, or may be implemented by a processor by executing a software instruction. The software instruction may include a corresponding software module. The software module may be stored in a random access memory (random access memory, RAM), a flash memory, a read-only memory (read only memory, ROM), an erasable programmable read-only memory (erasable programmable ROM, EPROM), an electrically erasable programmable read-only memory (Electrically EPROM, EEPROM), a hard disk, a removable hard disk, a compact disc, or any other form of storage medium well-known in the art. For example, a storage medium is coupled to a processor, so that the processor can read information from the storage medium or write information into the storage medium. Certainly, the storage medium may be a component of the processor. The processor and the storage medium may be located in an ASIC. In addition, the ASIC may be located in a core network interface device. Certainly, the processor and the storage medium may exist in the core network interface device as discrete components.

A person skilled in the art should be aware that in the foregoing one or more examples, functions described in the present invention may be implemented by hardware, software, firmware, or any combination thereof. When the present invention is implemented by software, the functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another place. The storage medium may be any available medium accessible to a general-purpose or special-purpose computer.

The objectives, technical solutions, and benefits of the present invention are further described in detail in the foregoing specific implementations. It should be understood that the foregoing descriptions are merely specific implementations of the present invention, but are not intended to limit the protection scope of the present invention. Any modification, equivalent replacement, or improvement made on the basis of the present invention shall fall within the protection scope of the present invention.

What is claimed is:

1. A packet sending method using cyclic queueing and forwarding, CQF, comprising:

obtaining, by a controller, a node latency of the first network node and a node latency of the second network node, wherein each node latency comprises a packet processing latency and a packet sending latency;

obtaining, by the controller, a link latency of a link on the forwarding path;

obtaining, by the controller, a forwarding latency requirement of a service flow and a destination address of the service flow;

calculating, based on the forwarding latency requirement and the destination address, a forwarding path for forwarding the service flow, wherein a latency of the forwarding path meets the forwarding latency requirement of the service flow, the forwarding path passes through a first network node, a second network node, and a third network node, the first network node is an ingress node of the forwarding path, the second network node is an intermediate node of the forwarding path, and the third network node is an egress node of the forwarding path, and further wherein the first network node, the second network node, and the third network node are located is a segment routing network;

obtaining, by the controller, a cycle duration of the first network node and a cycle duration of the second network node;

determining, by the controller, a first cycle number at which the first network node forwards a packet based on the cycle duration of the first network node and further determining a second cycle number at which the second network node forwards the packet, the second cycle number based on the cycle duration of the first network node;

determining a first adjacent segment identifier corresponding to the first cycle number and a second adjacent segment identifier corresponding to the second cycle number, wherein the packet is in the service flow;

wherein each network node has a packet receiving queue and a packet sending queue and each network node further has a clock, wherein the packet receiving queue and the packet sending queue exchange their roles after a fixed-length period of time, the fixed-length period of time being defined as a cycle, wherein sending of a packet in the packet sending queue is completed once in the cycle; and further wherein a correspondence between each adjacent segment identifier and a cycle number is established wherein an outbound interface of each network node corresponds to a plurality of adjacent segment identifiers, and a segment identifier corresponding to a port of a node is an adjacent segment identifier;

generating, by the controller, a label stack, wherein the label stack comprises sequentially, from a top of the stack to a bottom of the stack, the first adjacent segment identifier and the second adjacent segment identifier;

sending, by the controller, the label stack to the first network node, wherein the label stack is used to indicate the first network node to forward the packet via the forwarding path within a period of time corresponding to the first cycle number; and forwarding the packet, by the first network node based on the label stack at a cycle number which is determined according to the correspondence between an adjacent segment identifier and the cycle number.

2. The method according to claim 1, wherein the latency of the forwarding path meets the forwarding latency requirement of the service flow when a sum of the node latency of the first network node, the node latency of the second network node, and the link latency of the link on the forwarding path falls within a range of the forwarding latency requirement of the service flow.

3. The method according to claim 1, wherein the method further comprises:

obtaining, by the controller, a third cycle number of the first network node and a fourth cycle number of the second network node that are corresponding to a current time point of the controller;

determining, by the controller, the third cycle number wherein a start time point corresponding to the first cycle number is after the first network node receives the label stack; and determining, by the controller, a link latency between the first network node to the second network node, the packet processing latency of the second network node, the third cycle number, and the cycle duration of the second network node.

4. The method according to claim 1, wherein the method further comprises:

receiving, by the controller, a notification packet sent by the first network node, wherein the notification packet comprises the forwarding latency requirement and the destination address of the packet.

5. A controller, comprising a processor and a memory, the controller adapted to perform the steps of:

obtaining a node latency of the first network node and a node latency of the second network node, wherein each node latency comprises a packet processing latency and a packet sending latency;

obtaining a link latency of a link on the forwarding path;

obtaining a cycle duration of the first network node and a cycle duration of the second network node;

determining a first cycle number at which the first network node forwards a packet based on the cycle duration of the first network node and further determines a second cycle number at which the second network node forwards the packet, the second cycle number based on the cycle duration of the first network node;

determining a first adjacent segment identifier corresponding to the first cycle number and a second adjacent segment identifier corresponding to the second cycle number, wherein the packet is in the service flow;

wherein each network node has a packet receiving queue and a packet sending queue and each network node further has a clock, wherein the packet receiving queue and the packet sending queue exchange their roles after a fixed-length period of time, the fixed-length period of time being defined as a cycle, wherein sending of a packet in the packet sending queue is completed once in the cycle;

generating a label stack, wherein the label stack comprises sequentially, from a top of the stack to a bottom of the stack, the first adjacent segment identifier and the second adjacent segment identifier; and sending the label stack to the first network node, wherein the label stack is used to indicate the first network node to forward the packet via the forwarding path within a period of time corresponding to the first cycle number.

6. The controller according to claim 5, wherein the controller is further adapted to perform the further steps of:

the latency of the forwarding path meets the forwarding latency requirement of the service flow when a sum of the node latency of the first network node, the node latency of the second network node, and the link latency of the link on the forwarding path falls within a range of the forwarding latency requirement of the service flow.

7. The controller according to claim 5, wherein the controller is further adapted to perform the further steps of:
obtaining a third cycle number of the first network node and a fourth cycle number of the second network node that are corresponding to a current time point of the controller;
determining the first cycle number wherein a start time point corresponding to the first cycle number is after the first network node receives the label stack;
determining a link latency between the first network node and the second network node, the packet processing latency of the second network node, the third cycle number, and the cycle duration of the second network node.

8. The controller according to claim 5, wherein the controller is further adapted to perform the further steps of:
receiving a notification packet sent by the first network node, wherein the notification packet comprises the forwarding latency requirement and the destination address of the packet.

9. A first network node for use in cyclic queuing and forwarding CQF, comprising
an obtaining unit configured to obtain a packet and obtain a first label stack based on the packet, wherein the first label stack is a label stack corresponding to a forwarding path for forwarding the packet, the first label stack comprises an adjacent segment identifier of the first network node and an adjacent segment identifier of a second network node, the first network node being an ingress node of the forwarding path, and the second network node being an intermediate node of the forwarding path, and further wherein the first network node, the second network node, and the third network node are located is a segment routing network;
wherein a correspondence between each adjacent segment identifier and a cycle time number is established wherein an outbound interface of each network node corresponds to a plurality of adjacent segment identifiers, and a segment identifier corresponding to a port of a node is an adjacent segment identifier;
a processing unit configured to push the first label stack into the packet, wherein a top of the first label stack is the adjacent segment identifier of the first network node, determine, based on the adjacent segment identifier of the first network node, a cycle number at which the packet is forwarded, and pop out the adjacent segment identifier that is of the first network node that is in the first label stack, to obtain a second label stack; and
a sending unit, configured to send, to the second network node within a period of time corresponding to the cycle number, the packet comprising the second label stack.

10. The first network node according to claim 9, wherein the first network node is further adapted to perform the further steps of:
obtaining a forwarding latency requirement of a service flow and a destination address of the service flow;
sending the forwarding latency requirement of the service flow and the destination address of the service flow to a controller, to trigger the controller to determine, based on the forwarding latency requirement and the destination address, a forwarding path for forwarding the service flow and a label stack corresponding to the forwarding path, wherein the packet is in the service flow; and
receiving the label stack sent by the controller that is corresponding to the forwarding path.

11. The first network node according to claim 9, wherein the step of sending, to the second network node within the period of time corresponding to the cycle number, the packet comprising the second label stack comprises:
adding the packet to a packet queue corresponding to the cycle number, and when the packet queue is a sending queue, sending the packet to the second network node through an outbound interface corresponding to the adjacent segment identifier of the first network node.

12. The first network node of claim 9, wherein the first network node is further adapted to perform the steps of:
receiving a second packet sent by the second network node, wherein the second packet comprises a second label stack;
obtaining a top of the second label stack;
determining that the top of the second label stack is the adjacent segment identifier of the first network node, determine, according to a stored correspondence between an adjacent-segment identifier of another network node and a cycle number corresponding to the adjacent segment identifier of the other network node;
popping out the adjacent segment identifier of the first network node that is in the label stack of the first packet, to generate a third packet; and
sending the third packet to a next-hop network node of the first network node within a period of time corresponding to the cycle number corresponding to the adjacent segment identifier of the other network node.

13. The first network node according to claim 12, wherein the step of sending the third packet to the next-hop network node of the first network node comprises:
adding the third packet to a packet queue corresponding to the cycle number corresponding to the adjacent segment identifier of the other network node, and when the packet queue is a sending queue, sending the third packet to the next-hop network node of the first network node through an outbound interface corresponding to the adjacent segment identifier of the first network node.

* * * * *

UNITED STATES PATENT AND TRADEMARK OFFICE
CERTIFICATE OF CORRECTION

| | |
|---|---|
| PATENT NO. | : 11,706,149 B2 |
| APPLICATION NO. | : 17/035687 |
| DATED | : July 18, 2023 |
| INVENTOR(S) | : Xuesong Geng et al. |

It is certified that error appears in the above-identified patent and that said Letters Patent is hereby corrected as shown below:

In the Claims

In Column 21, Line 25, in Claim 9, delete "comprising" and insert -- comprising: --.

In Column 21, Line 26, in Claim 9, delete "packet" and insert -- packet, --.

In Column 22, Line 34, in Claim 12, delete "adjacent-segment" and insert -- adjacent segment --.

Signed and Sealed this
Third Day of October, 2023

*Katherine Kelly Vidal*

Katherine Kelly Vidal
*Director of the United States Patent and Trademark Office*